(12) United States Patent
Baluja et al.

(10) Patent No.: US 8,977,067 B1
(45) Date of Patent: *Mar. 10, 2015

(54) AUDIO IDENTIFICATION USING WAVELET-BASED SIGNATURES

(71) Applicant: Google Inc., Mountain View, CA (US)

(72) Inventors: Shumeet Baluja, Santa Clara, CA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/854,587

(22) Filed: Apr. 1, 2013

Related U.S. Application Data

(63) Continuation of application No. 11/468,265, filed on Aug. 29, 2006, now Pat. No. 8,411,977.

(60) Provisional application No. 60/823,881, filed on Aug. 29, 2006.

(51) Int. Cl.
  *G06K 9/46* (2006.01)
  *G10L 19/02* (2013.01)

(52) U.S. Cl.
  CPC ..................................... *G10L 19/02* (2013.01)
  USPC .......................................................... 382/240

(58) Field of Classification Search
  USPC .......................................... 382/240; 704/270
  See application file for complete search history.

(56) References Cited

U.S. PATENT DOCUMENTS

| | | | |
|---|---|---|---|
| 4,811,399 A | 3/1989 | Landell et al. | |
| 5,706,364 A | 1/1998 | Kopec et al. | |
| 5,870,744 A | 2/1999 | Sprague | |
| 6,023,693 A | 2/2000 | Masuoka et al. | |
| 6,044,365 A | 3/2000 | Cannon et al. | |
| 6,236,758 B1 | 5/2001 | Sodagar et al. | |
| 6,494,720 B1 | 12/2002 | Meyrowitsch | |
| 6,529,526 B1 | 3/2003 | Schneidewend | |
| 6,563,909 B2 | 5/2003 | Schmitz | |
| 6,585,521 B1 | 7/2003 | Obrador | |
| 6,704,920 B2 | 3/2004 | Brill et al. | |
| 6,751,601 B2 | 6/2004 | Zegers | |
| 6,754,667 B2 | 6/2004 | Kim et al. | |
| 6,763,339 B2 | 7/2004 | Fu et al. | |
| 6,766,523 B2 | 7/2004 | Herley | |
| 6,773,266 B1 | 8/2004 | Dornbush et al. | |

(Continued)

FOREIGN PATENT DOCUMENTS

| | | |
|---|---|---|
| EP | 1524857 | 4/2005 |
| JP | 2002209204 | 7/2002 |

(Continued)

OTHER PUBLICATIONS

Chinese Patent Office Action for Application No. 200680051559.0 dated Jan. 22, 2010, 14 pages.

(Continued)

*Primary Examiner* — John Strege
(74) *Attorney, Agent, or Firm* — Amin, Turocy & Watson, LLP

(57) ABSTRACT

A method is described that includes producing an audio spectrogram from a target sample, generating a number of fingerprints based on the audio spectrogram, comparing the series of fingerprints to samples in a data repository using wavelet coefficients, and identifying the target sample based on the matches found in the data repository.

20 Claims, 5 Drawing Sheets

(56) References Cited

U.S. PATENT DOCUMENTS

| | | | |
|---|---|---|---|
| 6,782,186 | B1 | 8/2004 | Covell et al. |
| 6,879,967 | B1 | 4/2005 | Stork |
| 6,892,191 | B1 | 5/2005 | Schaffer |
| 6,895,514 | B1 | 5/2005 | Kermani |
| 6,944,632 | B2 | 9/2005 | Stern |
| 6,970,131 | B2 | 11/2005 | Percy et al. |
| 7,103,801 | B2 | 9/2006 | Marilly et al. |
| 7,107,207 | B2 | 9/2006 | Goodman |
| 7,174,293 | B2 | 2/2007 | Kenyon et al. |
| 7,266,492 | B2 | 9/2007 | Goodman |
| 7,281,219 | B2 | 10/2007 | Hamilton et al. |
| 7,375,304 | B2 | 5/2008 | Kainec et al. |
| 7,386,479 | B2 | 6/2008 | Mizuno |
| 7,472,096 | B2 | 12/2008 | Burges et al. |
| 7,542,959 | B2 | 6/2009 | Barnhill et al. |
| 7,617,164 | B2 | 11/2009 | Burges et al. |
| 7,831,531 | B1 | 11/2010 | Baluja et al. |
| 7,991,770 | B2 | 8/2011 | Covell et al. |
| 8,131,083 | B2 | 3/2012 | Yoshino |
| 8,411,977 | B1 * | 4/2013 | Baluja et al. .................. 382/240 |
| 2002/0023020 | A1 | 2/2002 | Kenyon et al. |
| 2002/0133499 | A1 | 9/2002 | Ward et al. |
| 2002/0194585 | A1 | 12/2002 | Connelly |
| 2003/0028796 | A1 | 2/2003 | Roberts et al. |
| 2003/0033223 | A1 | 2/2003 | Mizuno |
| 2003/0093790 | A1 | 5/2003 | Logan et al. |
| 2003/0101144 | A1 | 5/2003 | Moreno |
| 2003/0225833 | A1 | 12/2003 | Pilat et al. |
| 2004/0025174 | A1 | 2/2004 | Cerrato |
| 2004/0030688 | A1 | 2/2004 | Aridor et al. |
| 2004/0031058 | A1 | 2/2004 | Reisman |
| 2004/0128682 | A1 | 7/2004 | Liga et al. |
| 2004/0199387 | A1 | 10/2004 | Wang et al. |
| 2005/0009620 | A1 | 1/2005 | Hodgetts |
| 2005/0066352 | A1 | 3/2005 | Herley |
| 2005/0086682 | A1 | 4/2005 | Burges et al. |
| 2005/0096920 | A1 | 5/2005 | Matz et al. |
| 2005/0147256 | A1 | 7/2005 | Peters et al. |
| 2005/0193016 | A1 | 9/2005 | Seet et al. |
| 2005/0283792 | A1 | 12/2005 | Swix et al. |
| 2006/0080356 | A1 | 4/2006 | Burges et al. |
| 2006/0174348 | A1 | 8/2006 | Rhoads et al. |
| 2007/0124756 | A1 | 5/2007 | Covell et al. |
| 2007/0130580 | A1 | 6/2007 | Covell et al. |
| 2007/0143778 | A1 | 6/2007 | Covell et al. |
| 2008/0090551 | A1 | 4/2008 | Gidron et al. |
| 2008/0247677 | A1 | 10/2008 | Yoshino |
| 2008/0263041 | A1 | 10/2008 | Cheung |
| 2012/0057787 | A1 | 3/2012 | Nishiyama et al. |

FOREIGN PATENT DOCUMENTS

| | | |
|---|---|---|
| JP | 2003163911 | 6/2003 |
| JP | 2004049438 | 2/2004 |
| JP | 2005122713 | 5/2005 |
| JP | 2005167349 | 6/2005 |
| JP | 2005532578 | 10/2005 |

OTHER PUBLICATIONS

Gauch, J. M., et al., "Identification of New Commercials Using Repeated Video Sequence Detection," Sep. 11, 2005, Image Processing, 2005, ICIP 2005, IEEE International Conference on Genova, Italy Sep. 11/14, 2005, Piscataway, NJ, USA, IEEE, pp. 1252-1255.

Sadlier et al., "Automatic TV Advertisement Detection from MPEG Bitstream," 2001, Pattern Recognition, vol. 35, Issue 12, pp. 2719-2726.

Supplemental EP Search Report dated Feb. 16, 2010, 97 pages.

Kang, et al., "A Multi-layer Adaptive Function Neural Network (MADFUNN) for Analytical Function Recognition," Neural Networks, 2006, IJCNN '06. International Joint Conference on Digital Object Identifier 10.1109/IJCNN.2006.246895 Publication Year 2006, pp. 1784-1789.

Kang, et al., "An adaptive function neural network ADFUNN) for phrase recognition," Neural Networks, 2005. IJCNN '05. Proceedings 2005 IEEE International Joint Conference on vol. 1, Digital Object Identifier: 10.1109/IJCNN.2005.1555898 Publication Year 2005, pp. 593-597, vol. 1.

Miyazawa, Y, "An all-phoneme ergodic HMM for unsupervised speaker adaptation," Acoustics, Speech, and Signal Processing, 1993, ICASSP-93, 1993 IEEE International Conference on vol. 2, Digital Object Identifier 10.1109/ICASSP. 1993.319372, Publication Year 1993, pp. 574-577, vol. 2.

Jeong, K., et al., "An information theoretic approach to adaptive system training using unlabeled data," Neural Networks, 2005. IJCNN '05. Proceedings. 2005 IEEE International Joint Conference on vol. 1, Jul. 31-Aug. 4, 2005, pp. 191-195, vol. 1 Digital Object Identifier 10.1109/IJCNN.2005.1555828.

Zhao, Z, "Connectionist training of non-linear hidden Markov models for speech recognition," Neural Networks, 1991. 1991 IEEE International Joint Conference on Nov. 18-21, 1991, pp. 1647-1652, vol. 2, Digital Object Identifier 10.1109/IJCNN.1991.170645.

Gorin, et al, "On adaptive acquisition of language," Acoustics, Speech, and Signal Processing, 1990. ICASSP-90, 1990 International Conference on Digital Object Identifier: 10.1109/ICASSP. 1990.115784 Publication Year 1990, pp. 601-604, vol. 1.

Wang, et al., "Training neural networks with additive noise in the desired signal," Neural Networks, IEEE Transactions on vol. 10, Issue 6, Nov. 1999, pp. 1511-1517.

Wang, et al., "Training neural networks with additive noise in the desired signal," Neural Networks Proceedings, 1998. IEEE World Congress on Computational Intelligence. The 1998 IEEE International Joint Conference on vol. 2, May 4-9, 1998, pp. 1084-1089, vol. 2, Digital Object Identifier 10.1109/IJCNN.1998.685923.

Ding et al., "Robust Technologies towards Automatic Speech Recognition in Car Noise Environments," Signal Processing, 2006 8th International Conference on vol. 1, Publication Year: 2006, 4 pages.

Weixin et al., "Learning to Rank Using Semantic Features in Document Retrieval," Intelligent Systems, 2009. GCIS '09. WRI Global Congress on vol. 3, Publication Year: 2009, pp. 500-504.

Lin et al., "Input Data Representation for Self-Organizing Map in Software Classification," Knowledge Acquisition and Modeling, 2009. KAM '09. Second International Symposium on vol. 2, Publication Year: 2009, pp. 350-353.

Notice of Reasons for Rejection for Japanese Patent Application No. 2008-543391, mailed Dec. 13, 2011, 3 pages.

EP Search Report dated Sep. 26, 2008, pp. 1-8.

U.S. Appl. No. 11/563,653, filed Nov. 27, 2006.

U.S. Appl. No. 11/563,661, filed Nov. 27, 2006.

Supplemental EP Search Report for EP Application No. 06838486.6 dated Feb. 16, 2010, 8 pages.

Supplemental EP Search Report for EP Application No. 06838488.2 dated Feb. 16, 2010, 7 pages.

Ma, Xing, Response to Final Office Action submitted May 2, 2011, in U.S. Appl. No. 11/563,661, filed Nov. 27, 2006, 17 pages.

Office Action in Japanese Application No. 2008-543391, mailed Jun. 5, 2012, 2 pages.

Response to Final Office Action submitted Jul. 24, 2012, in U.S. Appl. No. 11/563,653, 18 pages.

Office Action for U.S. Appl. No. 11/563,661, dated Jul. 3, 2008, 19 pages.

Response to Office Action for U.S. Appl. No. 11/563,661, dated Jul. 3, 2008, filed Jan. 5, 2009, 20 pages.

Office Action for U.S. Appl. No. 11/563,661, dated May 5, 2009, 27 pages.

Response to Office Action for U.S. Appl. No. 11/563,661, dated May 5, 2009, filed Oct. 5, 2009, 25 pages.

Office Action for U.S. Appl. No. 11/563,661, dated Jun. 28, 2010, 17 pages.

Response to Office Action for U.S. Appl. No. 11/563,661, dated Jun. 28, 2010, filed Oct. 27, 2012, 21 pages.

Office Action for U.S. Appl. No. 11/563,661, dated Oct. 24, 2012, 11 pages.

Office Action for U.S. Appl. No. 11/563,665, dated Feb. 27, 2009, 13 pages.

(56) References Cited

OTHER PUBLICATIONS

Response to Office Action for U.S. Appl. No. 11/563,665, dated Feb. 27, 2009, filed Jul. 21, 2009, 11 pages.
Office Action for U.S. Appl. No. 11/563,665, dated Oct. 28, 2009, 13 pages.
Response to Office Action for U.S. Appl. No. 11/563,665, dated Oct. 28, 2009, filed Mar. 1, 2010, 9 pages.
Response to Office Action for U.S. Appl. No. 11/563,653, dated Sep. 15, 2011, filed Jan. 13, 2012, 13 pages.
Office Action for U.S. Appl. No. 11/563,653, dated Apr. 5, 2012, 8 pages.
U.S. Appl. No. 11/563,665, filed Nov. 27, 2006.
Notice of Allowance for U.S. Appl. No. 11/563,653, dated Sep. 25, 2012, 9 pages.
"Community" definition. Oxford English Dictionary. Accessed Apr. 27, 2009. http://dictionary.oed..com/cgi/entry/50045241/single=1&query_type=word&queryword=community.
"Compression" definition. Oxford English Dictionary. Accessed Apr. 27, 2009. http://dictionary.oed.com/cgi/entry/50045890?single=1&query_type=word&queryword=compression.
"Database" definition. Oxford English Dictionary. Accessed Apr. 27, 2009. http://dictionary.oed..com/cgi/entry/50045241/single=1&query_type=word&queryword=database.
"Encrypt" definition. Oxford English Dictionary. Accessed Apr. 27, 2009. http://dictionary.oed..com/cgi/entry/50045241/single=1&query_type=word&queryword=encrypt.
Burges et al., "Using Audio Fingerprinting for Duplicate Detection and Thumbnail Generation," Mar. 2005, 4 pages.
Burges, et al., 'Duplicate Detection and Audio Thumbnails with Audio Fingerprinting' [online], 2004, [retrieved on Nov. 21, 2006]. Retrieved on the Internet: <URL: www.research.microsoft.coml-cburges/tech reports/tr-2004-19.pdt>, 5 pages.
Wang, "The Shazam Music Recognition Service," Communications of the ACM, Aug. 2006, 49(8): 5 pages.
C. E. Jacobs et al., "Fast Multiresolution Image Querying," Aug. 1995, Proceedings of SIGGRFAPH 95, in Computer Graphics Proceedings, Annual Conference Series, pp. 277-286.
Cano, et al., 'A Review of Algorithms for Audio Fingerprinting' [online], 2002, [retrieved on Nov. 21, 2006]. Retrieved from the Internet: <URL: www.iua.upf.es/mtglpubJications/MMSP-2002-pcano.pdt>, 5 pages.
Cohen, et al., "Finding Interesting Associations without Support Pruning," 2001, Retrieved from the Internet: <URL: www.dbis.informatik.huberlin.de/dbisold/lehre/WS0405/kDD/paper/CDFG_00.pdf>, 12 pages.
Viola, et al., "Robust Real-Time Object Detection," Int. J. Com12uter Vision, 2002.
'CS276 Information Retrieval and Web Mining' [online]. Stanford, 2005, [retrieved on Nov. 16, 2006]. Retrieved from the Internet: <URL: www.stanford.eduiclass/cs276lhandouts/lecture19.pdt>, 8 pages.
'Data Mining: Associations' [online]. Stanford, 2002, [retrieved on Nov. 16, 2006]. Retrieved from the Internet: <URL: www.stanford.eduiclass/cs206/cs206-2.pdt>, 11 pages.
International Preliminary Report on Patentability, Application No. PCT/US06/45549 mailed Jun. 12, 2008, 7 pages.
European Search Report, EP Application No. 08 15 3719 mailed Sep. 26, 2008, 8 pages.
International Preliminary Report on Patentability, Application No. PCT/US06/45551 mailed Apr. 2, 2009, 11 pages.
International Search Report and Written Opinion of the Corresponding PCT Application No. PCT/US06/45551 dated Jul. 21, 2008, 8 pages.
Haitsma, et al., 'A Highly Robust Audio Fingerprinting System' [online], 2002,[retrieved on Nov. 16, 2006]. Retrieved from the Internet: <URL: www.ismir2002.ismir.net/proceedingsI02-FP04-2.pdf>, 9 pages.
Jacobs, et al., 'Fast Multiresolution Image Querying' [online), 1995, [retrieved on Nov. 21, 2006]. Retrieved from the Internet: <URL: www.grail.cs.washington.edulprojects/query/mrquery.pdt>, 10 pages.
Ke, et al., 'Computer Vision for Music Identification' [online], 2005, [retrieved on ) Jan. 21, 2006]. Retrieved from the Internet: <URL: www.cs.cmu.edul-yke/musicretrievai/cvpr2005-mr.pdt>, 8 pages.
Ke, Y., et al., "Computer Vision for Music Identification," 2005, Computer Vision and Pattern Recognition.
Office Action for U.S. Appl. No. 11/563,653, dated Sep. 15, 2011, 8 pages.
PCT International Search Report and Written Opinion of the Corresponding PCT Application No. PCT/US06/45549 dated Oct. 9, 2007, 10 pages.
'Shazam Entertainment Brings Music Recognition to Windows Mobile 5.0 Powered Smartphones' [online]. Shazam, 2006, [retrieved on Nov. 16, 2006]. Retrieved from the Internet: <URL: www.shazam.comlmusic/portaVsp/s/mediatypelhtml/user/anonipage/defaultltemplate/pages/p/company. release30 .html>, 1 page.
'Shazam Experience Music' [online]. [retrieved on May 30, 2007]. Retrieved from the Internet: <URL: www.shazam.com/music/portal/sp/s/media-type/html/user/anon/page/default/template/My1home/music.html>, 2 pages.
Stollnitz et al., 'Wavelets for Computer Graphics: A Primer, Part 2' [online], 1995, [retrieved on Nov. 21, 2006). Retrieved from the Internet: <URL: www.grail.cs.washington.eduipub/sto]IIwavelet2.pdt>, 9 pages.
Stollnitz et al., 'Wavelets for Computer Graphics: A Primer, Part 1' [online), 1995, [retrieved on Nov. 21, 2006]. Retrieved from the Internet: <URL: www.grail.cs.washington.eduipub/stoiVwaveletl.pdt>, 8 pages.
Notice of Allowance for U.S. Appl. No. 11/468,265, dated Dec. 3, 2012, 22 pages.
Office Action for U.S. Appl. No. 11/468,265, dated Jul. 30, 2009, 12 pages.
Office Action for U.S. Appl. No. 11/468,265, dated Mar. 30, 2012, 53 pages.
Office Action for U.S. Appl. No. 11/468,265, dated May 13, 2010, 10 pages.
Office Action for U.S. Appl. No. 11/468,265, dated Sep. 20, 2012, 17 pages.
Notice of Allowance for U.S. Appl. No. 11/563,653, dated Jan. 16, 2013, 17 pages.
Ghouti et al., "A Fingerprinting System for Musical Content," Jul. 9-12, 2006, Multimedia and Expo, 2006 IEEE International Conference, pp. 1989-1992.
Office Action for U.S. Appl. No. 13/195,330, dated Mar. 14, 2013, 43 pages.
Notice of Allowance for U.S. Appl. No. 11/563,661, dated Mar. 1, 2013, 20 pages.
Koo et al.; Speech Recognition and Utterance Verification Based on a Generalized Confidence Score; 2001; pp. 821-832.
Authorized Officer B. Copenheaver. PCT International Search Report for PCT/US2006/045549, dated Oct. 9, 2007, 10 pages.

* cited by examiner

US 8,977,067 B1

AUDIO IDENTIFICATION USING WAVELET-BASED SIGNATURES

CROSS REFERENCE TO RELATED APPLICATION

This application is a continuation of U.S. patent application Ser. No. 11/468,265 filed Aug. 29, 2006 entitled AUDIO IDENTIFICATION USING WAVELET-BASED SIGNATURES which claims the benefit of U.S. Provisional Application No. 60/823,881, filed Aug. 29, 2006, and entitled "Waveprint: Efficient Wavelet-Based Audio Fingerprinting", the contents of each are hereby incorporated by reference in entirety.

BACKGROUND

The advent of highly distributable, high volume data storage has allowed for the storage of vast amounts of information on a variety of topics and in a variety of forms such as text, images, music, and videos.

The availability and ease of communications continues to increase. Accompanying this increase is an interest in combining various communications with additional information. For example, an individual may hear one communication (e.g. a song) and want to know additional information, such as the song title, artist, etc. about what was heard.

The problem of efficiently finding similar items in a large corpus of high-dimensional data points arises in many real-world tasks, such as music, image, and video retrieval. Beyond the scaling difficulties that arise with lookups in large data sets, the complexity in these domains is exacerbated by an imprecise definition of similarity. Capturing items can introduce anomalies that are not similar across capture mechanisms and can be affected by the capture environment, adding additional complexity.

SUMMARY

In one aspect, a method is described that includes initializing one or more data repositories and evaluating a target sample. Initializing one or more data repositories includes providing one or more samples to a data processing system, converting the audio portion of each sample to a spectrogram, creating one or more intensity images from the spectrogram, computing wavelets for each intensity image, selecting the top wavelet coefficients, and storing the top wavelet coefficients in one or more data repositories. Evaluating a target sample includes providing the target sample to a data processing system, converting the audio portion of the target sample to a spectrogram, creating one or more intensity images from the spectrogram, computing wavelets for each intensity image, selecting the top wavelet coefficients, and locating matching samples in the one or more data repositories using the top wavelet coefficients of the intensity images of the target sample.

The steps of converting, creating, computing, selecting, and storing can be repeated a plurality of times.

The samples and target sample can be audio samples. The samples and target sample can be multi-media samples including audio.

Locating matching samples in the one or more data repositories using the top wavelet coefficients of the target sample can include comparing the top wavelet coefficients of one or more images of the target sample with the top wavelet coefficients of the samples stored in the one or more data repositories, determining the samples that match the images, and identifying the target sample based on the samples from the one or more data repositories that have the greatest number of matches with the one or more images.

Locating matching samples in the one or more data repositories using the top wavelet coefficients of the target sample can include comparing the top wavelet coefficients of one or more images of the target sample with the top wavelet coefficients of the samples stored in the one or more data repositories, constructing the temporal order of the images of the target sample, determining the samples that match the images, and identifying the target sample based on the sequential ordering of the one or more images of the target sample.

Locating matching samples in the one or more data repositories using the top wavelet coefficients of the target sample can include comparing a representation of the top wavelets of one or more images of the target sample with a representation of the top wavelets of the samples stored in the one or more data repositories, determining the samples that have matching representations, comparing the top wavelet coefficients of one or more images of the target sample with the top wavelet coefficients of the identified samples, and identifying the target sample based on the samples from the one or more data repositories that halves the greatest number of matches with the one or more images.

Comparing a representation of the top wavelets can include using a hashing process. Comparing a representation of the top wavelets can include using a compression process. Comparing a representation of the top wavelets may include a comparison process using Min-Hash and LSH.

Initializing one or more data repositories can include providing corpus samples to a data processing system and placing each sample in the data repositories in accordance with the top wavelet coefficients computed by the data processing system.

In another aspect, a method is described including providing a target sample including audio, producing a spectrogram of the audio portion, and computing wavelet coefficients for the spectrogram. The method can also include matching wavelet coefficients of the target sample against samples including wavelet coefficients in one or more data repositories, and identifying the target sample.

Computing wavelet coefficients can include producing an intensity image from the spectrogram and using the intensity image to create the wavelet coefficients of the spectrogram. Computing wavelet coefficients can include selecting the top wavelets of the wavelet representation. The top wavelets can include less than about 20% of the total wavelets. The top wavelets can include less than about 10% of the total wavelets.

Matching can include comparing the top wavelet coefficients of one or more images of the target sample with the top wavelet coefficients of the samples stored in the one or more data repositories, and determining the samples that match the images. Matching can include comparing a representation of the top wavelets of one or more images of the target sample with a representation of the top wavelets of the samples stored in the one or more data repositories, and determining the samples that have matching representations. Matching can include using a hashing process.

Identifying can include constructing the temporal order of the images of the target sample, and identifying the target sample based on the sequential ordering of the images of the target sample.

In another aspect a method is described including converting the audio portion of one or more samples to one or more representations including wavelet coefficients, initializing a data repository including storing the one or more representations of samples that are to be included as entries in the data repository, and evaluating a target sample for a match to the samples in the data repository including locating one or more matches in the data repository using wavelet coefficients of the target sample and wavelet coefficients of the samples in the data repository.

Evaluating can include comparing compressed representations of the wavelet coefficients, can include comparing top wavelet coefficients of the target sample and top wavelet coefficients of the samples in the data repository, or can include comparing representations of the wavelet coefficients.

In another aspect, a method is described including producing an audio spectrogram from a target sample, creating one or more intensity images from the spectrogram, generating a number of target representations based on the one or more intensity images, matching the representations with sample representations in a data repository, and identifying the target sample based on the matches found in the data repository.

The representations can be based on wavelet coefficients. Matching can include matching compressed or reduced versions of the representations. Identifying can include using a cumulative voting scheme of the samples matched in the data repository over the target representations. Identifying can include using a temporal constraint of the sample representations matched in the data repository over the target representations. Dynamic programming can be used to determine the temporal constraints.

In another aspect, an apparatus is described including means for initializing a data repository including mapping samples that are to be included as entries in the data repository to locations in the data repository using wavelet coefficients of the audio portion of each sample, and means for evaluating a target sample for a best match to the samples in the data repository including using wavelet coefficients of the audio portion of the target sample to identify one or more matches in the data repository.

In another aspect, a method is described including converting the audio portion of one or more samples to one or more representations, initializing a data repository including storing the one or more representations of samples that are to be included as entries in the data repository, and evaluating a target sample for a match to the samples in the data repository including utilizing hashing in combination with a voting scheme having a threshold value greater than 1 to reduce the number of possible matches of the samples in the data repository.

There exists a need to identify and/or retrieve similar audio, image and video data from extensive corpuses of data. The large number of elements in the corpuses, the high dimensionality of the points, and the imprecise nature of "similar" make this task challenging in real world systems. In addition, real world effects, introduced by the sampling environment, sampling device, transmission, etc. can affect the data used. These effects can include increased noise, competing signals, signal degradation, low signal strength, and signal modification. These may be present due to signal capturing, which may be accomplished by capturing an audio signal using a microphone (such as with a cell phone, hand held device, etc.), by digital transfer, or by signal capturing by a presentation device (such as a query based on a radio, television, or digital transmission). One or more of these difficulties can be overcome as will be discussed below.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A system for finding similar sounding matches in a data repository using representations of samples for matching is described. The system takes an audio signal and converts it to a series of representations. These representations can be a small set of wavelet coefficients. The system can store the representations, and the representations can be used for matching purposes.

The benefits of using this approach include the ability to match songs and samples taken under a variety of conditions—such as when transmission is poor, when noise is added to the sample, when there is another song playing in the background, when a song is encoded in any of the numerous possible standards (such as WAV, mps, real, etc.), when any standard is used with different compression/quality settings, etc. In addition, the system is able to match or identify target samples even when there have been perturbations/distortions in the sample—such as poor recording conditions, increased or decreased bass or treble levels, time-scale modification, or other change.

Figure 1:
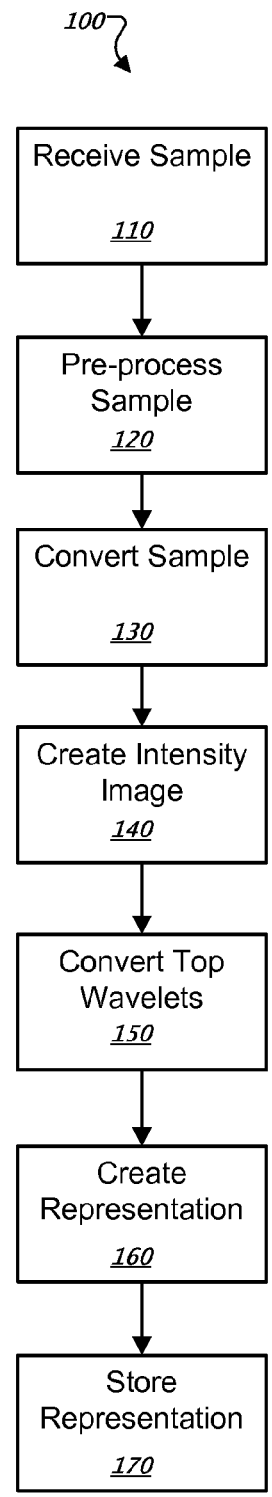
FIG. 1 is a flow chart illustrating an exemplary method for processing audio samples.

FIG. 1 is a flow chart illustrating an exemplary method for processing audio samples.

A method 100 will be described in reference to a data processing system that implements the method to process audio samples. These processed samples can be used in various ways. In one implementation, the audio sample is created from an audio source (such as a song). In other implementations, the audio sample is created from the audio component of other media (such as films, commercials, television shows, etc.). An audio sample produced from a multi-media source can be processed using the same method.

In one implementation, representations of the processed audio samples can be stored for later use, such as using the stored representations of the audio samples as a database for comparison against incoming audio samples. Thus, the steps 110-170 of the method can be applied against a large set of songs or other audio samples to produce one or more data repositories or databases of samples.

The method 100 begins with the receipt 110 of a song or other audio sample. The system can receive one or more songs or audio samples from various sources. For example, the songs or audio samples can be provided from a database, from external media (such as a CD, CD-R, DVD, DVD-R, tape, MP3 player, etc.), from samples that have been uploaded to the system by a user, or from other sources.

In some implementations, the audio sample can be pre-processed 120 before conversion. This may be done for various reasons. For example, it can be more computationally efficient to pre-filter the audio sample before conversion, or it can be more efficient to pre-process the sample to reduce the noise of the audio sample, improve the signal-noise ratio, or pre-processing can be done for other reasons. In one implementation, pre-processing can include the application of a low-pass filter to the input audio at some value above the top of a selected frequency range and downsampling of the filtered signal.

After the audio sample is received, and after any optional pre-processing, each audio sample is converted 130 from the audio format of the sample (e.g., MP3, way, etc.) to an alternative representation. In one implementation, the alternative representation is a magnitude-only spectrogram over a pre-selected frequency range. For implementations using a multimedia sample, it is the audio portion of the sample that is converted.

The magnitude-only spectrogram can use any one of a variety of sample spacings across frequency, including linear, logarithmic, or mel-scale spacing. Once the spacing scheme is determined, the same spacing scheme can be used for the processing of all audio samples to be used in a database. Generally, the sample spacing may range from 1 up to any number. With a final number of frequency samples designated as B, the audio sample is binned into B bins. The audio sample is also processed using a time step scale. The spectrogram-slice sampling rate in time (i.e. the slice step size, or slice period) is determined for the samples and designated S. Generally, S will be determined and established to be consistent for all samples in a database. However, as S can have a range of values, a most effective value of S may depend on characteristics of the audio samples. In other words, the most effective and efficient slice period may be different for a data repository or database of speeches than for a data repository or database of songs. Therefore, different implementations can have different values of S.

Once the system has converted the received audio sample, a series of intensity images are created 140 for the representation (e.g., the spectrograms). The intensity images can be of the form of 2-dimensional images composed of B samples and L periods. In one implementation, the intensity image can be formed with B samples (across frequency) on the X-axis and L periods (across time) on the Y-axis. Each pixel of the intensity image contains a value. In one implementation, each pixel value is scaled to a value between 1 and 255. In one implementation, the values are not re-scaled. In other implementations, other scaling ranges are used, such as linear, logarithmic, or other scaling scheme. Subsequent intensity images can be created by going forward in time a number of steps and generating a new image. The number of steps moved forward to generate the next image is measured by the number of L periods, and is designated F. In one implementation, F is less than L. Successive images can overlap (e.g., the end of image N can be the start of image N+1). The amount of overlap can be set, and in one implementation, overlap is greater than 50%.

The intensity images can be converted 150 into wavelets. Wavelets are a mathematical tool for hierarchically decomposing functions. Wavelets allow a function to be described by its overall shape and successively increasing details. Wavelets can be defined using many different basis functions, such as Haar, Coiflet, or other. In one implementation, initially, there is no compression in the wavelet representation, therefore a B×L image is described by B×L wavelets.

In one implementation, the system can simultaneously compute intensity images and wavelet representations. Since only the wavelet representations are needed in subsequent steps, relaxing the requirement to temporarily store the intensity images can have beneficial effects, such as reduced storage requirements and improved computational efficiency.

Instead of using all wavelets for describing a sample, in one implementation, the method can describe an audio sample/song using only characteristic wavelets. In this implementation, a certain number of wavelets (designated T) are extracted from the B×L wavelets. In one implementation, these top T wavelets are selected by magnitude. In one implementation, the wavelets having the highest amount of change, either positive or negative, are selected. Various parameters of the wavelets can be stored. For example the sign, location, amplitude, or other information can be retained for each selected wavelet. In one implementation, T is selected and defined such that T is less than B×L. In another implementation, T is selected and defined such that T is substantially less than B×L. Once these T wavelets are extracted, the system uses the wavelets and does not need the original intensity image.

The method continues with the creation of representations 160 of the processed audio sample.

In one implementation, the representation can be based on the top wavelets. Top wavelets can be represented as the top magnitude coefficients of the wavelets. In one implementation, once the top magnitudes are determined, they can be scaled into a scaled representation. In one implementation, this representation can be described as a series of negative ones, zeros and ones, where the negative ones represent the negative top magnitudes, ones represent the positive top magnitudes, and zeros represent every other magnitude in the wavelet.

In one implementation, the representation can be based upon a compressed version of the top wavelets. One suitable compression technique is run-length encoding. Run-length encoding combines like values into a smaller representation. For example, the representation {A, B, B, B, B, B, B, C, A, A} can be compressed into {A, 6B, C, 2A}. Other suitable compression techniques, such as Min-hash, can also be used.

The data structure for these representations can be in various forms. In one implementation, the representation can be based on the wavelets. For example, the data structure can be an array or linked list where each element of the data structure includes a coefficient, or a hash table where each hash bin includes one or more coefficients of related samples.

The type of data structure can define how the information is managed. For example, a linked list node can maintain a coefficient, the head of the node points to the previous coefficient (i.e., node) of the sample, and the tail of the node points to the next coefficient (i.e., node) of the sample. Alternatively, each index of the array can maintain a coefficient, where each array index (e.g., [0 ... N–1] or [1 ... N]) specifies an ordering to the coefficients. For example, a coefficient at index x–1 comes from an earlier point in time than the coefficient at index x. In some implementations, different types of data structures can be used simultaneously to represent the information. For example, an array or linked list can be used to represent a single sample, while a hash table can be used to bin like samples into similar locations.

After the representations are computed, these representations can be stored 170 in a data repository for later use. In one implementation, the representations can be used for matching or identification purposes of later target samples. These representations can include additional information in addition to the representation data. In one implementation, the representation also includes time information related to the original audio sample. For example, the representation can include the time at which the representation begins, such as 1000 ms after the start of the song from which the representation derives. In one implementation, the representation also includes information about the original audio sample, such as the title, artist, etc. In one implementation, the representation includes an indicator that can be used to obtain additional information. For example, the indicator may be used as a key to retrieve information from another data structure or database. The key can be used as an index into a look-up table or an associative array, can be used as the basis for a hash function, can be used as a hash result specifying a location in a hash table, or can be used to specify some other way to retrieve the information.

Figure 2:
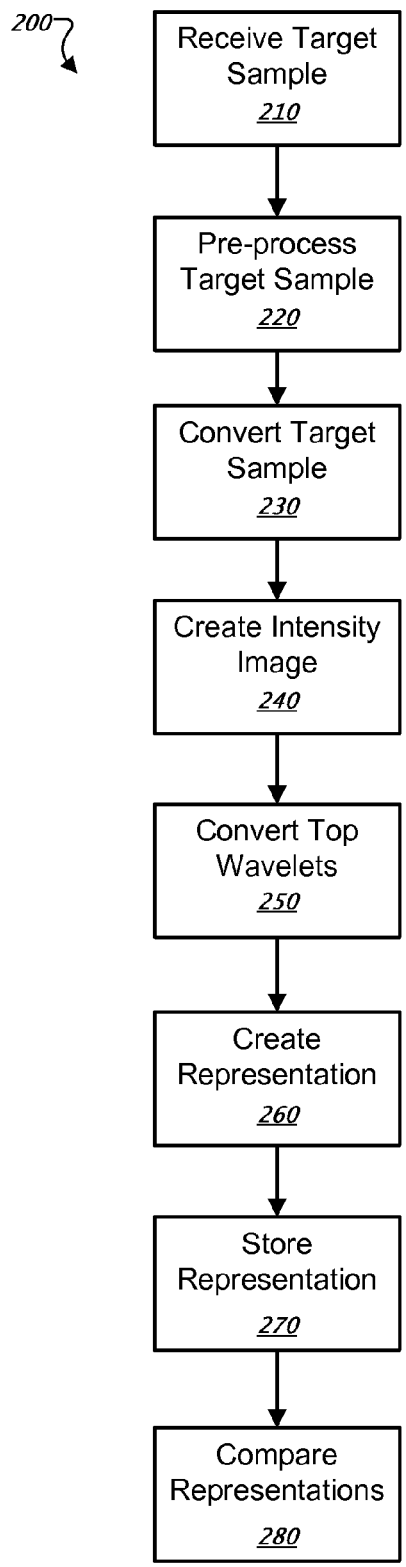
FIG. 2 is a flow chart illustrating an exemplary method for processing and comparing audio samples.

FIG. 2 is a flow chart illustrating an exemplary method for processing and comparing audio samples.

A method 200 will be described in reference to a data processing system that implements the method to process and compare audio samples.

The method 200 begins with the receipt 210 of a target sample. The target sample can be a complete audio samples (such as an entire song), or can be a portion of a song or other audio sample. In one implementation, the target sample can be created from solely an audio source (such as a song). In other implementations, the target sample can be created from the audio component of other media (such as films, commercials, television shows, etc.). An audio sample produced from a multi-media source can be processed using the same method 200. The target sample received can vary in length and quality. In one implementation, the system can receive a target sample from a variety of sources.

In one implementation, the target sample can be pre-processed 220. Pre-processing of samples can be done for various reasons, as described earlier. In one implementation, prior to computing a representation, the system can apply a low-pass filter to the input audio at some value above the top of the selected frequency range, and then the system can downsample the input audio accordingly.

The target sample received by the system can be of a different quality than the audio samples used to produce the samples stored in the data repository. Often, the target sample may be of a poorer quality than the audio samples used to populate the data repository (corpus samples). In one implementation, the target sample can be pre-processed to a greater degree than the corpus samples. In one implementation, in addition to a low pass filter, the target sample can be high pass filtered. In one implementation, the target sample can be filtered more than one time at varying frequencies to reduce noise levels.

The target sample is then converted 230 into an alternative representation (e.g., spectrogram). The representation can be of the form of a magnitude-only spectrogram and can use any one of a variety of sample spacings across frequency, including linear, logarithmic, or mel-scale spacing. The target sample can be converted into a spectrogram as described earlier. The target sample can be processed using the same sample spacing as was used to process the samples to populate the data repository.

The representation is then used to create 240 one or more intensity images. The intensity images can be of the form of 2-dimensional images composed of B samples and L periods. These images can be produced as described earlier. The number of steps moved forward to generate the next image is designated F and measured by the number of L periods. In one implementation, F (or the separation window) can be the same as was used to process the corpus samples. In one implementation, separation window F, is different than was used to process the corpus samples. In one implementation, the separation window F can vary. Thus, the separation window can be pre-determined, or generated randomly. In one implementation, the separation window F is generated randomly. In one implementation, the separation window F is generated randomly and constrained to values related to the original slice window. For example, if the original separation window was 10, the random separation window can be constrained between 5 and 15. In one implementation, each separation window can be computed separately for each intensity image. Successive images can overlap (e.g., the end of image N can be the start of image N+1) as discussed above.

The intensity images can be converted 250 into an alternative representation, e.g., wavelets. Wavelets are a mathematical tool for hierarchically decomposing functions. This conversion can be done as described previously. Initially, as there is no compression in the wavelet representation, a B×L image is described by B×L wavelets (a full computed wavelet).

In one implementation, the raw computed wavelets can be stored and used for matching. However, there can be changes in the wavelet values due to small changes in the audio sample (i.e. noise, echo, background sound), resulting in a number of wavelets that are likely to be different than a wavelet produced from a sample taken under different conditions. These differences increase the difficulty of matching.

In one implementation, the system extracts the top wavelet coefficients. A certain number of wavelets (designated T) are extracted from the B×L wavelets. In one implementation, these top T wavelets are selected by magnitude. Various parameters of the wavelets can be stored. For example the sign, location, amplitude, or other information can be retained for each selected wavelet. In one implementation, T is selected and defined such that T is less than B×L. In another implementation, T is selected and defined such that T is much less than B×L. Once these T wavelets are extracted, the system uses the wavelets and does not need the original intensity image.

The system then creates representations 260 of the processed audio sample. As described above, various representations may be used. In one implementation, the representation can be based on the top wavelets. In one implementation, the representation can be based on scaled top wavelets and described as a series of negative ones, zeros and ones, where the negative ones represent the negative top magnitudes, ones represent the positive top magnitudes, and zeros represent every other magnitude in the wavelet. In one implementation, the representation can be based upon a compressed version of the wavelets. Suitable compression techniques include run-length encoding, Min-Hash, and other approaches.

The data structure for these representations can be in various forms. In one implementation, the representation can be based on the wavelets. For example, the data structure can be an array or linked list where each element of the data structure includes a coefficient, or a hash table where each hash bin includes one or more coefficients of related samples.

The system can store 270 these representations. In one implementation, the representations are stored. Storage of the representations provides an ability to retain and compare the target sample against corpus samples previously stored. Matching can be the result of the proximity (e.g., in the same bin or in a location in the data repository) of the target sample to other previously stored corpus samples. In one implementation, the representations are stored only temporarily for comparison purposes. In one implementation, the representations are not stored.

As described previously, the data structure can be represented in many forms, including an array, a linked list, or a hash table. The data structures store the current representation in a way that is easily retrievable during subsequent steps. For example, the data structure can be saved to local storage (e.g., a hard disk), remote storage, or some combination thereof.

Using the representations computed from the target sample (and optionally stored), by the previously mentioned steps 210-270, the system can compare 280 received target samples to samples stored in the database. The comparison process, described in more detail in reference to FIG. 3, uses representations of the target sample and database samples. Comparisons of the representations can be made directly using representation data, or indirectly by mapping one or more groups of data using hash information, bin location, etc. Furthermore, although any of numerous transformations or methods may be used to convert an audio sample to a representation, the same method that was used to convert the corpus audio samples to populate the database must be used to convert the target sample for comparison and identification with the database.

In one implementation, the comparison process is carried out indirectly. In one implementation, the comparison can include mapping each target representation to a data structure including the sample representations. The sample representations located at the same mapping location are considered to be a match. This process can be repeated for all of the target representations.

In one implementation, the comparison process can be carried out by a direct comparison of each target representation to the designated sample representations. A direct comparison can be done on an individual sample basis to determine matching samples. In one implementation, the target representation and sample representations may be directly compared using scaled top wavelets. A direct comparison can also be done on a group basis, where non-matching sample representations can be eliminated in a recursive or stepwise fashion.

Figure 3:
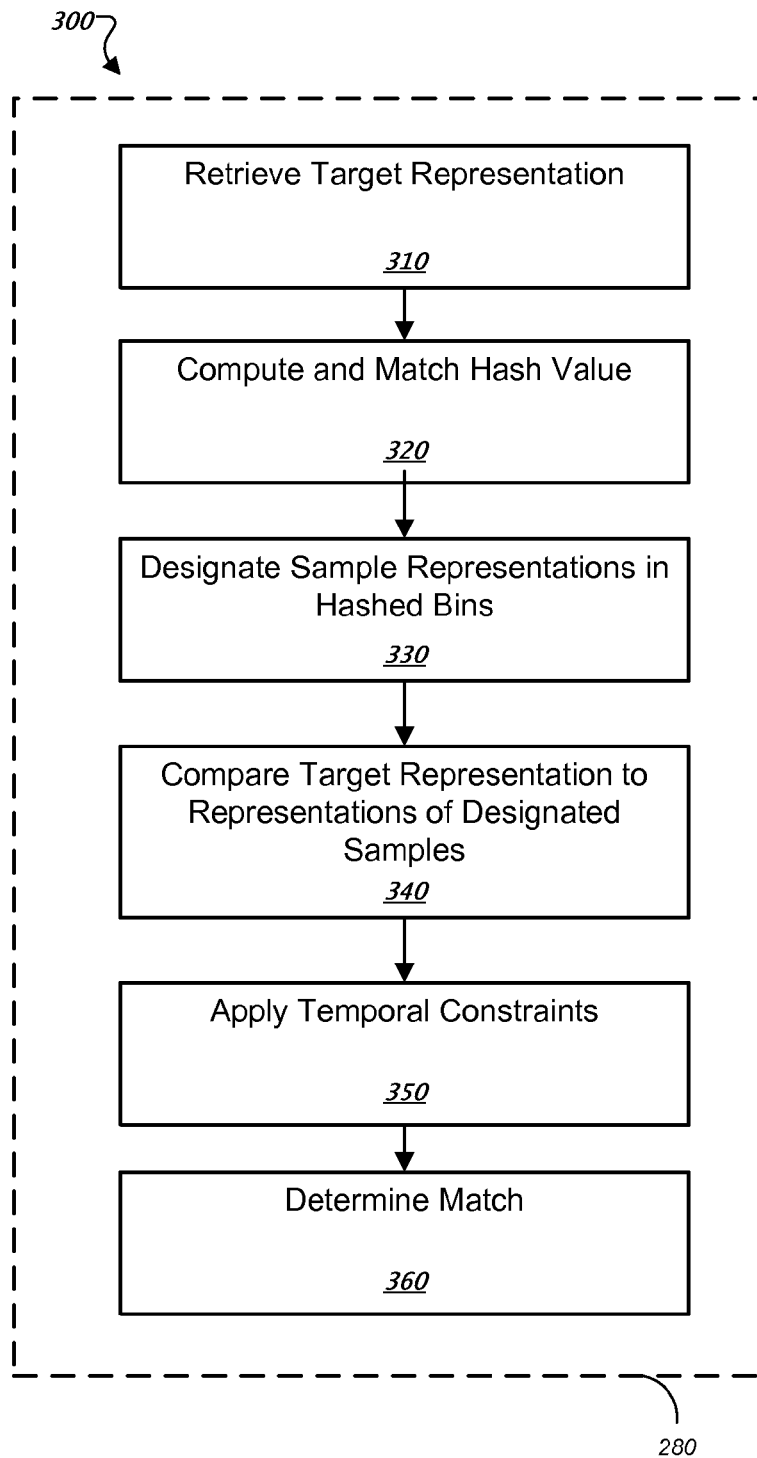
FIG. 3 is a flow chart illustrating an exemplary method for comparing representations.

FIG. 3 is a flow chart illustrating an exemplary method for comparing representations.

A method 300 will be described in reference to a data processing system that implements the method to compare representations. A target audio sample can be matched and identified using representations. In one implementation, a match can be determined by using the number of top-wavelet coefficients that are the same in a representation of a target sample, and representations in a data repository. In one implementation, every sample representation in a database is compared to new target representations from a received target audio sample. This can be very computationally expensive, depending on the number of songs and song images in the database. Because of the computational complexity, it is not desirable or necessary to match samples or songs using all of the wavelets. In some implementations, a compression scheme, such as Min-Hash or a hashing scheme, such as LSH, or both, can be used to reduce the complexity. Hashing the representation can generate a hash value. The hash value can be used to specify a bin in a hash table.

A compression scheme, such as Min-Hash, can be used to create a new signature based on the top wavelet signature. For example, if 1000 top wavelets are used, the compressed signature could be 50 or 100 long. Other hashing schemes, such as LSH, or locality sensitive hashing, can be used by the system to determine which signatures the system should compare the new signature against. Using compression enables the system to compare smaller signatures. Using a hashing scheme enables the system to compare a target sample signature against a smaller number of signatures, rather than against every signature in the database. Furthermore, it is possible to combine hashing and compression techniques to further improve computational efficiency. In one implementation, Min-Hash can be combined with LSH to yield a system that has a smaller number of searchable signatures, where each signature is a compressed representation of the original target sample spectrogram.

One or more representations can be retrieved 310 for a target sample. These representations may be retrieved from storage in a data repository, or may be retrieved from a prior step in a data processing system, and can be referred to as target representations. In one implementation, the target representations can be processed in such a way to reduce the number of direct comparisons or matching of the target representations required. In one implementation, hashing schemes (e.g., LSH) can be used to reduce the number of representations retrieved for comparison and matching.

The retrieved representations of the target sample can be used to compute and match 320 a hash value. The representation is computed by a hash function that generates a hash value. In one implementation, the hash value can be used to match the target representations to a hash bin. As described above, if certain steps are employed (e.g., LSH), information with similar qualities will, with high probability, exist in the same bin, whereas information with dissimilar qualities will, with high probability, exist in different bins. Using the hashed value, the system can limit the match of the target represent to a subset of the samples with the most similar qualities.

The system can then designate 330 each sample representation in the matched hash bin. In one implementation, only these designated sample representations are used for further matching purposes. This reduces the number (and hence time and resources required) of comparisons required between the target representations and sample representations.

In one embodiment, a voting scheme can be used on these sample representations in the matching hash bins. In this case, all of the sample representations from all of the hash bins can be identified, and the number of occurrences of each sample designation summed. And, only those sample representations that occur in excess of a certain threshold are designated. Thus, in one embodiment, rather than designating all sample representations in all matching hash bins, only the sample representations from matching hash bins that exceed a voting threshold are designated.

Once the one or more sample representations have been designated, the sample representations are retrieved and the target representations compared 340 against the retrieved sample representations. The closest match for each target representation is the sample representation that is the most similar. In one implementation, similarity is measured based on the most similar wavelet coefficients. Evaluating samples using wavelet coefficients can include using the original wavelets, using some portion of the wavelet coefficients, using scaled coefficients, using a representation of the coefficients, using parameters derived from the wavelet coefficients, or any other evaluation or comparison based in whole or in part on the representation stored.

The system can compare multiple representations from the target sample to the representations in the data repository or database. In various implementations, a target sample can include a few seconds or minutes of a song from which the system derives multiple images, and hence multiple representations. The system can track the total number of matches for each song in the database using the previously mentioned steps of comparing representations. For example, if the system is matching representations of 100 images from the target sample, then the maximum number of matches a sample can have equals 100.

In one implementation, the system then applies 350 a temporal constraint to the matching criteria. Instead of only counting the number of matches that the target representations have to an identifier representing an audio sample (such as a song), the system can determine if the target representations are matched in a correct order, as specified by the representations of the audio samples they are matching. In one implementation, dynamic programming is used to determine the temporal constraints.

Temporal coherence can be used for various purposes. For example, even if a target sample was 'sped-up' relative to the actual timing, the system can use temporal coherence to determine a match. In one implementation, temporal coherence can be used as an additional factor for matching purposes. Even if an audio sample is time shifted, the matches will still most likely occur in order. For example, SongA can be identified as a better match to a target sample than SongB in certain cases where the matches to the representations of SongB occur out of order. In one implementation, the notion of temporal coherence can be implemented as a penalty to the matching score of songs that occur out of order.

After the temporal constraints have been applied, the matching audio sample is determined 360. The determination can be made based on the matching score to a number of sample representations, the temporal constraint score, or some combination thereof. Thus, the matching audio sample is determined by matching a number of representations, the representations produced by the process described above.

In one implementation, the matching score can be determined using additional information from the sample representations matched by the target representations. Each sample representation in the database also has an identifier. Thus, the process of matching target representations to sample representations can include a summation over the identifiers of all matching representations. For example, using 100 target representations, identifier 1 may have a total of 94 based on the matches of target representations, identifier 2 may have a total of 79 based on the matches of target representations, and identifier 3 may have a total of 37 based on the matches of target representations. In one implementation, the matching score can be modified by the temporal coherence determined earlier.

In one implementation, the processed target samples can be compared against a database of stored samples for matching and identifying the processed target sample. This matching and identification can be done to provide information to a user (such as song title, artist, etc.) about the target sample. This matching and identification can also be done to match the target sample against a catalog to determine if they already exist in a database, if the uploaded target samples are copyrighted material, or for other purposes.

Figure 4:
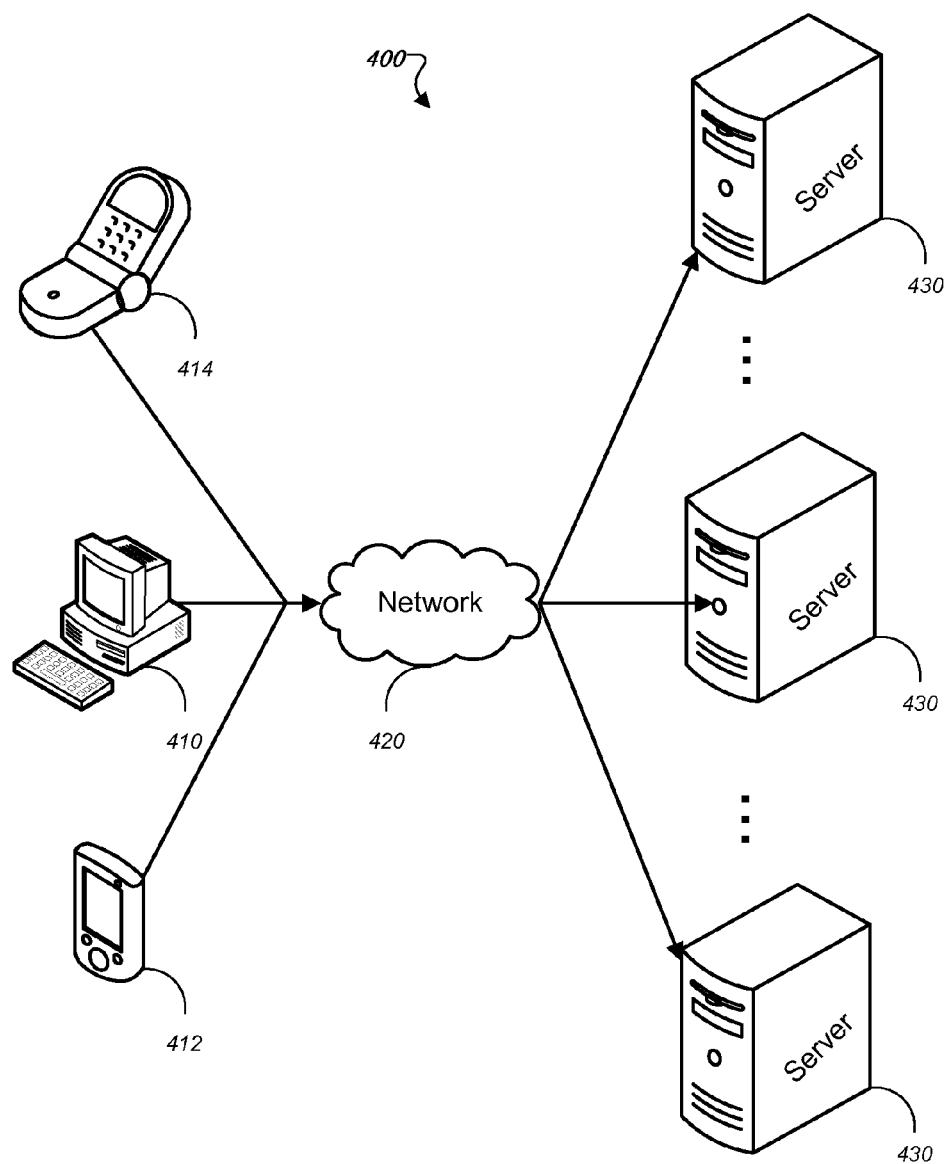
FIG. 4 is a block diagram illustrating an exemplary system for processing and comparing audio samples.

FIG. 4 is a block diagram illustrating an exemplary system for processing and comparing audio samples.

The example system 400 includes a client machine, such as a computer 410, a digital assistant 412, a cell phone 414, or other device. The example system 400 also includes a network 420, and one or more servers 430. The client machine 410-414 can send data, such as a song or audio sample, through the network 420 to one or more servers 430. The servers 430 can process the data, as described above, and can return results to the client 410-414 through the network 420. In one implementation, the data encompasses a song sample, and the servers 430 can return a list of one or more songs that can be the matching song. In another implementation, the system 400 can use the returned similarity information to determine if matching songs are copyrighted, or if the songs already exist in a centralized location, such as the servers 430.

Figure 5:
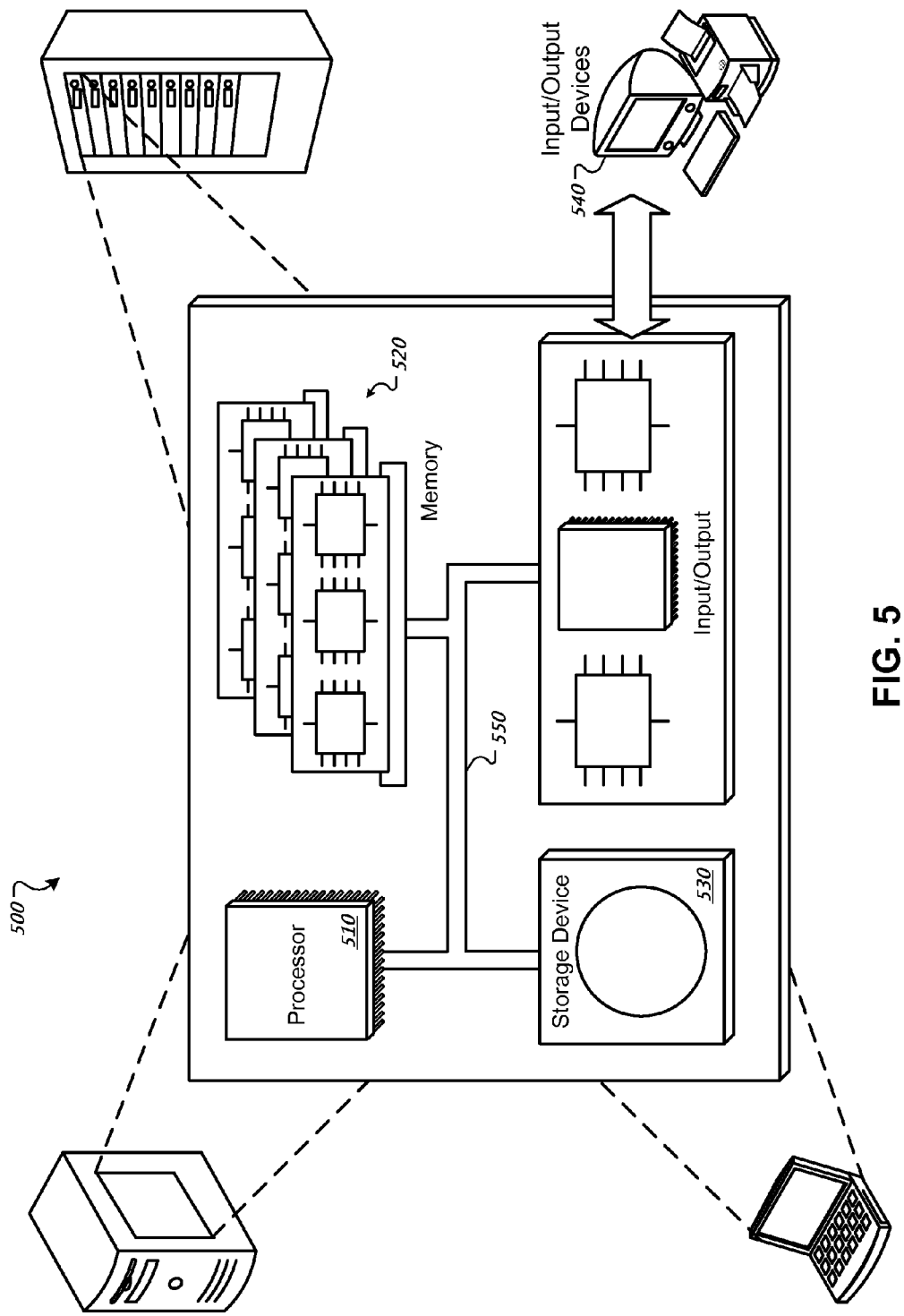
FIG. 5 is a block diagram of an example of a generic computer system.

FIG. 5 is a block diagram of an example of a generic computer system. The system 500 can be used for the operations described in association with the methods discussed above according to one implementation.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 400. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

EXAMPLES

Example 1

In one example implementation, a database was created using 6,500 songs, with 200 audio samples (each approximately ~1.5 seconds) extracted from each song, with a resulting total of 1,300,000 samples. Thus, each song was converted into a series of samples for storage in the database.

Each song was converted from a typical audio format (e.g., mp3, way, etc.) to a mel-frequency spectrogram with tilt and amplitude normalization over a pre-selected frequency range (400 Hz to 4 kHz). For computational efficiency, the input audio was low-pass filtered to about 5/4 of the top of the selected frequency range and then down sampled accordingly. For example, using 4 kHz as the top of our frequency range of interest and using 44.1 kHz as the input audio sampling rate, we low-pass filtered using a simple FIR filter with an approximate frequency cut between 5 and 5.5 kHz and then subsampled to a 11.025 kHz sampling rate. To minimize volume-change effects, the audio sample energy was normalized using the local average energy, taken over a tapered, centered 10-second window. To minimize aperture artifacts, the average energy was also computed using a tapered Hamming window.

A spectrogram "slice rate" of 100 Hz (that is, a slice step size of 10 ms) was used. For the slices, audio data was taken, and a tapered window (to avoid discontinuity artifacts in the output) applied, and then an appropriately sized Fourier transform was applied. The Fourier magnitudes were "de-tilted" using a single-pole filter to reduce the effects of low-frequency bias and then "binned" (averaged) into B frequency samples at mel-scale frequency spacing (e.g., B=32).

Example 2

The process for creating an audio spectrogram described in Example 1 is followed, with the additional steps of creating intensity images, generating wavelets from the intensity images, extracting the top wavelets and storing the wavelet coefficients.

A series of intensity images are converted from the audio spectrogram. These fingerprint intensity images are formed by a number of slices timewise along the spectrogram. The length of the fingerprint is set to be 1.5 seconds. Using a sampling rate of 256 (i.e., L as previously described) for each fingerprint yields a time step of 5.8 milliseconds. At each time step, the spectrogram is sampled. Thus, the intensity image is composed of 32 frequency samples×256 time samples. The next fingerprint begins a certain number of time steps after the first fingerprint (i.e. F as previously described). In this implementation, F is selected to be 50. Therefore, the first fingerprint begins at time=0 of the spectrogram, and is formed of 256 slices (of 32 frequency samples) for a total length of 1.5 seconds. The next fingerprint begins at time=0.292 seconds, and is formed of 256 slices (of 32 frequency samples) for a total length of 1.5 seconds. It can be seen that there is a large overlap between one fingerprint sample and the next fingerprint sample. The same process continues over the whole probe length.

The intensity images formed from 256 slices×32 frequency samples (8192 in total) in each fingerprint are then scaled from 1 to 255 using a logarithmic scale. This B×L image can be described using B×L Haar wavelets. At this point, only the wavelets are retained, and prior representations (spectrogram, intensity image) are no longer needed or used.

Then, the top wavelets are extracted, and the top 1000 wavelet coefficients are identified (using magnitude only), and all other wavelet coefficients are set to 0. Then, the top 1000 wavelet coefficients are set to be 1 or −1, using the sign of the original wavelet coefficient. At this point, only these forced wavelet coefficients (1/0/−1) are retained, and all prior representation (including the full wavelet representation) are no longer needed or used. This produces a series of subfingerprints for the samples. The wavelet representation (e.g., a series of 1, 0, and −1 coefficients) are stored in the database. The coefficients can be run length encoded to reduce their storage footprint.

Example 3

In one implementation, a target audio sample is received for identification. A system first processes the received audio by creating an audio comparison sample ("probe") by taking the first 10 seconds of the received audio sample. Then, the probe sample was converted in the same manner as in Example 1. This sampling produced a magnitude-only spectrogram.

A series of intensity images are converted from this spectrogram. These images are created in the same manner as in Example 2. The intensity images are converted to wavelets, and the top wavelets extracted, as described in Example 2. This produces a series of subfingerprints for the probe.

Each of the forced top wavelet representations (subfingerprint) of the probe is then described using run length encoding (e.g., Min-Hashing). First, the subfingerprints are converted to binary. Then, the run length encoding process creates a description using multiple (100) passes in the data.

This run-length description of each subfingerprint of the probe is then compared against a database using soft hashing (e.g., LSH, or Locality Sensitive Hashing) to identify a subset of samples. In general, this process uses cumulative voting across a number of hash keys. After a number of passes comparing each run length encoded portion of the probe to the database, samples that meet a certain threshold (at least 2 matches) using LSH are identified.

The probe is then compared to the identified samples using full run length encoding. The sample that best matches the probe using Min-Hashing is declared the matching sample.

The target sample is then identified by the greatest number of samples matched. These matched samples include additional information (such as song title, artist, speaker, location, etc.). Therefore, the additional information for the greatest number of matched samples is considered to be, and can be reported as, the identification information for the target sample.

Example 4

The process of Example 3 is followed, with the addition that after samples have been identified using LSH, there is an additional step.

The probe can use the order of the subfingerprints to further refine the audio sample's score. During the pre-processing described in previous examples, time indexes of the subfingerprints are stored, defining a sequence of subfingerptints in time. When the probe is comparing received samples with samples in the database, uses the timing information as a strong indicator of a correct match.

For example, the system may take 5 samples (N1, N2, N3, N4, and N5) from a target sample having a length of 10 seconds. The system stores and therefore "knows" the order in which the samples occur. If, the 5 samples match, say, 5 samples in 2 different songs (e.g., SongA and SongB), the system can take into account the order of the match as well as the number of matches. For example, SongB's score will be assessed with a larger negative modifier. This is illustrated in the following table:

TABLE 1

| Sample | Song  | Image # |
|--------|-------|---------|
| N1     | SongA | 12      |
| N2     | SongA | 14      |
| N3     | SongA | 15      |
| N4     | SongA | 16      |
| N5     | SongA | 17      |
| N1     | SongB | 19      |
| N2     | SongB | 5       |
| N3     | SongB | 112     |
| N4     | SongB | 101     |
| N5     | SongB | 18      |

If SongB's match score was originally marginally higher than SongA's match score, for example 100 and 90 respectively, the negative modifier can be large enough to name SongA the winner.

If SongB's match score was originally substantially higher than SongA's match score, for example 100 and 50 respectively, the negative modifier may not be large enough to impact the final results. For example, it may be that even though SongB is less ordered than SongA, because it matched substantially more subfingerprints, it is an overall better match.

Example 5

This example describes one possible process for identifying a subset of samples using soft hashing (generally described in Example 3).

In this example, a subfingerprint of 20 integers is divided using LSH into 5 regions, each of 4 integers. This assists in finding signatures in a database that may not match on all regions, but match on at least one region. In addition, a voting scheme is implemented on top of the LSH process.

```
Subfingerprint = ABCD EFGH IJKL MNOP QRST
REGION 1:      hash-key ABCD
               finds:    song1 - second 12.2
                         song3 - second 4.5
                         song19 - second 110.0
REGION 2:      hash-key EFGH
               finds:    song19 - second 2.9
                         song30 - second 23.2
                         song179 - second 5.0
REGION 3:      hash-key IJKL
               finds:    song1 - second 2.9
                         song309 - second 13.7
                         song122 - second 25.0
REGION 4:      hash-key MNOP
               finds:    song1 - second 2.9
                         song122 - second 25.0
REGION 5:      hash-key QRST
               finds:    song1 - second 2.9
```

The instances of each of the identified items are then summed across all regions as votes:

| Sample | Votes |
|---|---|
| song1 - second 12.2 | 1 |
| song1 - second 2.9 | 3 |
| song3 - second 4.5 | 1 |
| song19 - second 110.0 | 1 |
| song19 - second 2.9 | 1 |
| song30 - second 23.2 | 1 |
| song122 - second 25.0 | 2 |
| song179 - second 5.0 | 1 |
| song309 - second 13.7 | 1 |

A minimum threshold of votes is then set (i.e. at least 2 votes) in order to be considered for a match. Thus, instead of designating and checking all of the items found, only two items would be designated and checked:

| | |
|---|---|
| song1 - second 2.9 | 3 |
| song122 - second 25.0 | 2 |

Particular implementations of the subject matter described in this specification have been described. Nevertheless, it will be understood that various modifications may be made without departing from the spirit and scope of the invention. For example, the actions recited in the claims can be performed in a different order and still achieve desirable results. Other implementations are within the scope of the following claims.

What is claimed is:

1. A method comprising:
   generating, by a device including a processor, a spectrogram of a first audio sample, wherein the spectrogram is generated using a first time separation window that is constrained to a predefined range of values from a second time separation window value employed in other spectrograms of other audio samples;
   computing, by the device, wavelet coefficients for the spectrogram of the first audio sample;
   comparing, by the device using a first searching algorithm, the computed wavelet coefficients for the spectrogram of the first audio sample to stored wavelet coefficients for the other spectrograms of other audio samples to identify a subset of the other spectrograms, respectively having a plurality of wavelet coefficients that match a plurality of the wavelet coefficients of the spectrogram of the first audio sample, in which to employ a second searching algorithm; and
   identifying, by the device using the second searching algorithm, from the subset of the spectrograms, a second audio sample that corresponds to one of the subset of the other spectrograms that matches the spectrogram.

2. The method of claim 1, further comprising randomly selecting the first time separation window.

3. The method of claim 1, further comprising randomly selecting the first time separation window based upon one or more characteristics of the first audio sample.

4. The method of claim 1, wherein the generating the spectrogram further comprises highpass filtering the first audio sample.

5. The method of claim 1, wherein the wavelet coefficients are compressed wavelet coefficients.

6. A non-transitory computer readable storage medium having instructions stored thereon that, in response to execution, cause at least one device including a processor to perform operation comprising:
   generating a spectrogram of a first audio sample, wherein the spectrogram is generated using a first time separation window that is constrained to a predefined range of values from a second time separation window value employed in other spectrograms of other audio samples;
   computing wavelet coefficients for the spectrogram of the first audio sample;
   comparing, using a first searching algorithm, the computed wavelet coefficients for the spectrogram of the first audio sample to stored wavelet coefficients for the other spectrograms of other audio samples to identify a subset of the other spectrograms, respectively having a plurality of wavelet coefficients that match a plurality of the wavelet coefficients of the spectrogram of the first audio sample, in which to employ a second searching algorithm; and
   identifying, using the second searching algorithm, from the subset of the spectrograms, a second audio sample that corresponds to one of the subset of the other spectrograms that matches the spectrogram.

7. The non-transitory computer readable storage medium of claim 6, the operations further comprising randomly selecting the first time separation window.

8. The non-transitory computer readable storage medium of claim 6, the operations further comprising randomly selecting the first time separation window based upon one or more characteristics of the first audio sample.

9. The non-transitory computer readable storage medium of claim 6, wherein the generating the spectrogram further comprises highpass filtering the first audio sample.

10. The non-transitory computer readable storage medium of claim 6, wherein the wavelet coefficients are compressed wavelet coefficients.

11. A system comprising:
   at least one memory having stored therein computer-executable instructions;

at least one processor communicatively coupled to the at least one memory, the at least processor configured to execute the computer-executable instructions to perform operations comprising:

generating a spectrogram of a first audio sample, wherein the spectrogram is generated using a first time separation window that is constrained to a predefined range of values from a second time separation window value employed in other spectrograms of other audio samples;

computing wavelet coefficients for the spectrogram of the first audio sample;

comparing, using a first searching algorithm, the computed wavelet coefficients for the spectrogram of the first audio sample to stored wavelet coefficients for the other spectrograms of other audio samples to identify a subset of the other spectrograms, respectively having a plurality of wavelet coefficients that match a plurality of the wavelet coefficients of the spectrogram of the first audio sample, in which to employ a second searching algorithm; and identifying, using the second searching algorithm, from the subset of the spectrograms, a second audio sample that corresponds to one of the subset of the other spectrograms that matches the spectrogram.

12. The system of claim 11, the operations further comprising randomly selecting the first time separation window.

13. The system of claim 11, the operations further comprising randomly selecting the first time separation window based upon one or more characteristics of the first audio sample.

14. The system of claim 11, wherein the generating the spectrogram further comprises highpass filtering the first audio sample.

15. The system of claim 11, wherein the wavelet coefficients are compressed wavelet coefficients.

16. A system comprising:

means for generating a spectrogram of a first audio sample, wherein the spectrogram is generated using a first time separation window that is constrained to a predefined range of values from a second time separation window value employed in other spectrograms of other audio samples;

means for computing wavelet coefficients for the spectrogram of the first audio sample;

means for comparing, using a first searching algorithm, the computed wavelet coefficients for the spectrogram of the first audio sample to stored wavelet coefficients for the other spectrograms of other audio samples to identify a subset of the other spectrograms, respectively having a plurality of wavelet coefficients that match a plurality of the wavelet coefficients of the spectrogram of the first audio sample, in which to employ a second searching algorithm; and means for identifying, using the second searching algorithm, from the subset of the spectrograms, a second audio sample that corresponds to one of the subset of the other spectrograms that matches the spectrogram.

17. The system of claim 16, further comprising means for randomly selecting the first time separation window.

18. The system of claim 16, further comprising means for randomly selecting the first time separation window based upon one or more characteristics of the first audio sample.

19. The system of claim 16, wherein the generating the spectrogram further comprises highpass filtering the first audio sample.

20. The system of claim 16, wherein the wavelet coefficients are compressed wavelet coefficients.

\* \* \* \* \*